H. R. BROWN.
FLYTRAP.
APPLICATION FILED JAN. 7, 1919.

1,320,986.

Patented Nov. 4, 1919
2 SHEETS—SHEET 1.

Inventor
H. R. Brown
By
Attorney

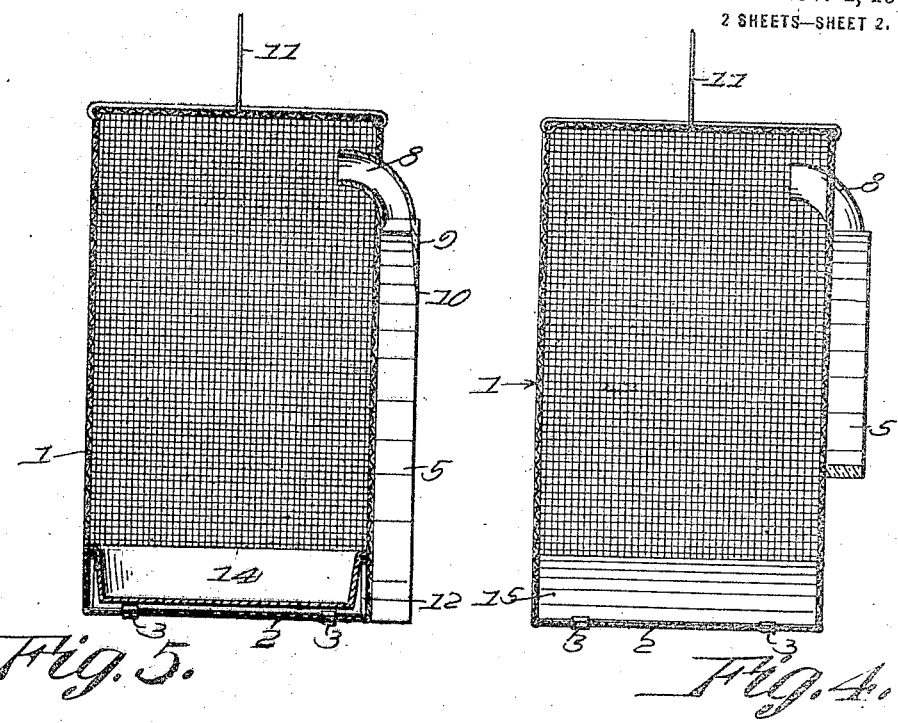
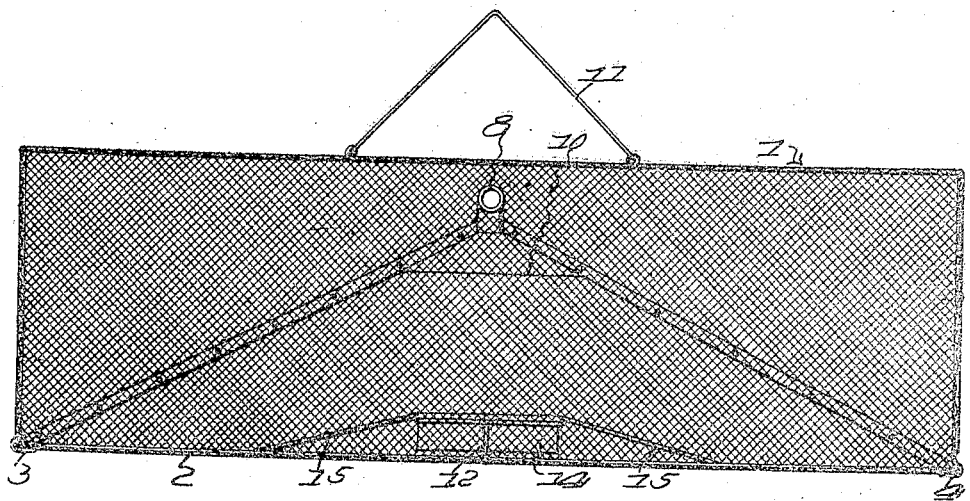

UNITED STATES PATENT OFFICE.

HUTCH R. BROWN, OF DRUMHELLER, ALBERTA, CANADA.

FLYTRAP.

1,320,986.  Specification of Letters Patent.  Patented Nov. 4, 1919.

Application filed January 7, 1919. Serial No. 270,085.

*To all whom it may concern:*

Be it known that I, HUTCH R. BROWN, a subject of the King of England, residing at Drumheller, in the Province of Alberta and Dominion of Canada, have invented new and useful Improvements in Flytraps, of which the following is a specification.

As its principal purpose, the invention seeks to provide a new and novel form of fly trap so designed that flies will be enticed to enter the trap. The trap consists essentially of a screen cage member with means for supporting it at the top of a door or window and associated with this cage there is a plate-glass member carried at the back and spaced away from the cage, the glass member being designed to lie against the door or window and having its lower edge beveled, so that flies, as they climb up the window or door, will be led on to the plate-glass member and from there directed into the interior of the cage, and novel means providing for their admission into the cage from the glass being provided. A further purpose of the invention is to provide a device of this character which is simple in construction, durable and effective in operation and inexpensive to manufacture.

Still further and other purposes will appear as the invention is set forth in detail in the description which follows.

To the exact form in which the invention is shown and described, it is not to be restricted. The right is reserved to make such changes or alterations as the actual reduction to practice may suggest, providing such changes or alterations do not deviate from the scope of the annexed claims.

In the accompanying drawings:

Fig. 4 is a section on the line 4—4 of Fig. 2.

Fig. 5 is a section on line 5—5 of Fig. 2.

Fig. 6 is a longitudinal sectional view similar to Fig. 1 but taken on an intermediate line between the front and back walls of the trap.

Figure 1:
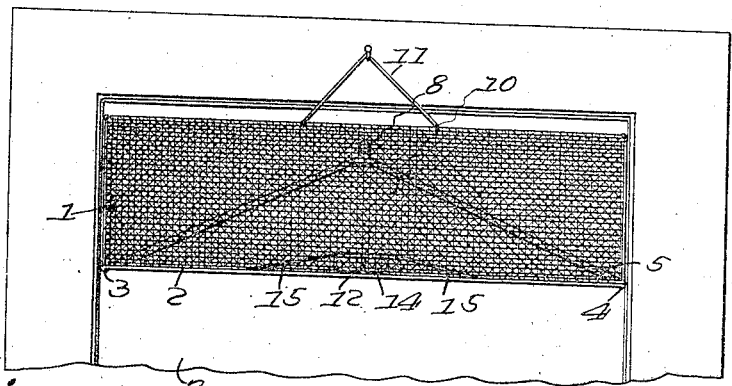
Figure 1 is a front elevational view showing the practical application of the invention.
Figure 2:
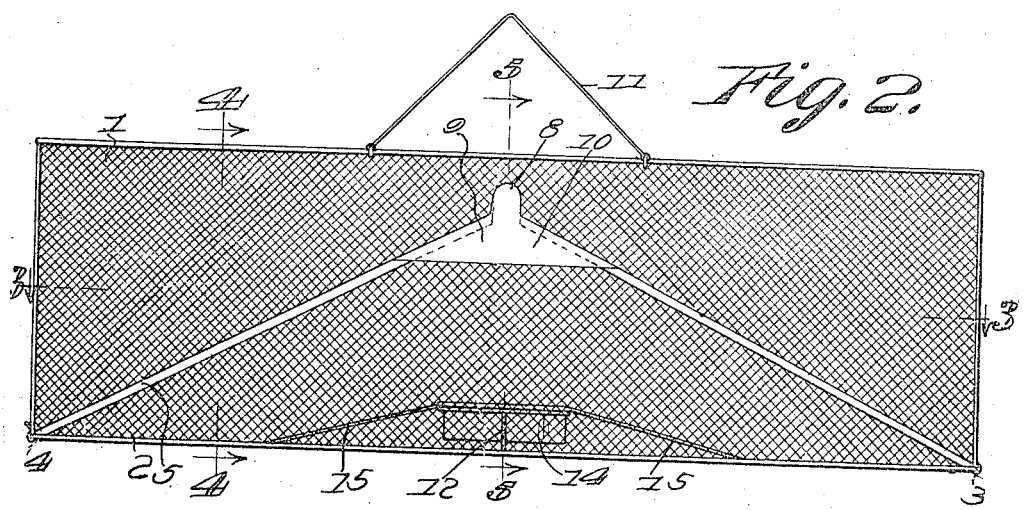
Fig. 2 is a front elevational view of the trap *per se*.
Figure 3:
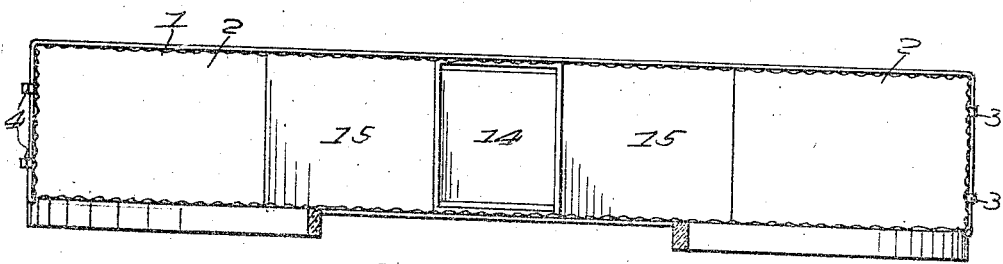
Fig. 3 is a section on the line 3—3 of Fig. 2.

As shown the invention comprises a cage member 1 in the form of a rectangular parallelepiped and made preferably of a wire frame covered with a durable wire mesh, as shown. The cage is provided with a bottom 2 made preferably of sheet metal and swingingly attached to the cage at one end by means of hinges 3, the other end being detachably connected to the cage by the fastening clips 4. This swingingly mounted bottom is provided for the purpose of emptying the cage of entrapped flies or insects. At the back of the cage there are attached two diagonally disposed bars 5 made preferably of glass and extending from the lower rear corners of the cage toward the longitudinal center of the cage and toward the top thereof. These bars 5 are made preferably of glass and are secured to the wire mesh formed at the back of the cage by appropriate fastening means 6, as shown. The bars 5 are of such a width that they may serve to space the cage away from the door or window 7 on which it is hung, thus making it possible for flies crawling up the window to pass behind the cage and below the bars. At the upper ends, the bars are united with a glass tubular member 8 to which they are fastened and this tubular member is curved so that its free end lies in a corner at right angles to the back of the cage and this free end is of sufficient length to permit its entering the cage from the rear. Just below the tubular member 8 there is a plate-glass member 9 which is fastened to the two bars 5 and which has its free or lower edge 10 beveled to a knife edge, so that flies crawling off a window pane may readily pass up on the web 9.

In order that the device may be supported on the door a flexible hanging member 11 is provided and the ends of this member are adequately attached to the cage.

Supported on the longitudinal centers of the two bottom wires forming the frame of the cage there is a vat support 12 which receives and sustains a poison vat 14. On opposite sides this support 12 has attached to it the plates 15 which are inclined toward and contact with the bottom 2 when the latter is in closed position. Of course these plates 15 bear firmly against the bottom 2 and in that way provide for flies or insects standing on the bottom easily passing on to the plates from the tops of which they may enter the vat 14 filled with poison.

In the use of the device, which is hung on the door or window, as shown in Fig. 1 and, because of the tendency of flies and similar insects to crawl upward when alighting on a window or door, the flies will pass in behind the back of the cage 1, but they may not pass behind the diagonally disposed bars 5 which, converging toward the longitudinal center of the cage, will direct the flies over toward the web 9, whose beveled edge 10 will permit them to enter thereonto and to pass into and through the tube 8 into the cage, where they will remain entrapped and where a large percentage will be poisoned by entrance into the poison vat. The flies of course would die when entrapped even though they were not poisoned, and when the trap has become filled with a quantity of dead flies, it may be emptied, the operation necessary to perform this requiring only the unfastening of the clips 4, when the bottom 2 will swing downwardly, thus permitting the trap to be emptied.

From the foregoing description and, accompanying drawings, it is believed that a clear enough understanding of the invention will be had to render further description unnecessary.

The invention having been described, what is claimed as new and useful is:

1. A trap of the kind described comprising a cage, diagonally disposed bars mounted at the back of the cage and converging toward the longitudinal center thereof, a web uniting the bars adjacent the extremities of their converging ends, the web being formed at the edges opposite those connected with the cage, and an L shaped tubular member connected with the web and with the bars and entering the cage for the useful purpose specified.

2. Insect trap comprising a cage, diagonally disposed bars mounted at the back of the cage and converging toward the longitudinal center thereof, a web uniting the bars adjacent the extremities of their converging ends, the web being formed at the edges opposite those connected with the cage, and being beveled at its free edge in a direction away from the cage, and an L shaped tubular member connected with the web and with the bars and entering the cage for the useful purpose specified.

3. An insect trap comprising a cage, a hingedly mounted bottom therefor, means for directing insects into the cage, a vat support carried by the cage adjacent the bottom, diagonally disposed plates connected with the vat support on opposite sides and having their free ends bearing upon the bottom when the latter is closed, and a vat carried in the vat support for the useful purpose specified.

In testimony whereof I affix my signature.

HUTCH R. BROWN.